Dec. 16, 1969  T. H. HOULE ET AL  3,484,020
CODE CONTROLLED APPARATUS
Filed Dec. 26, 1967  2 Sheets-Sheet 1
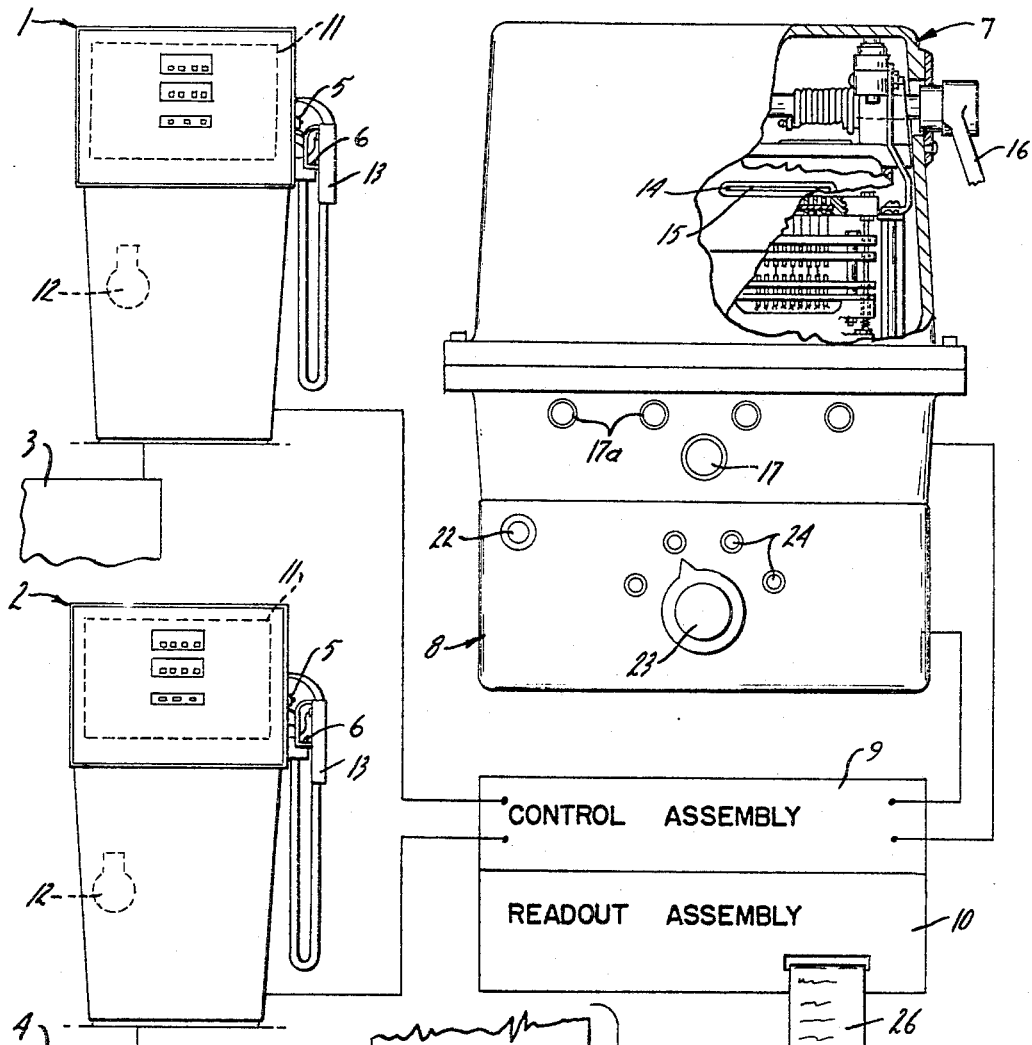
FIG. 1
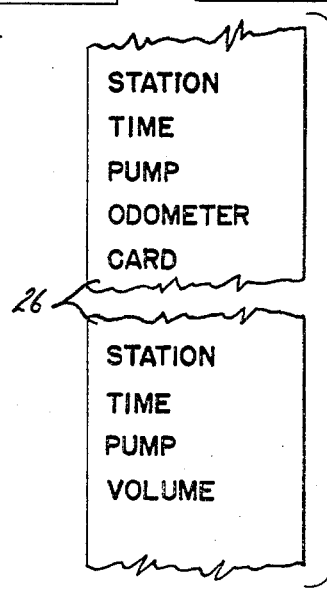
FIG. 3
STATION
TIME
PUMP
ODOMETER
CARD
STATION
TIME
PUMP
VOLUME
FIG. 4
INVENTORS
TIM H. HOULE
DONALD J. KOPYDLOWSKI
BY
Andrus & Starke
Attorneys

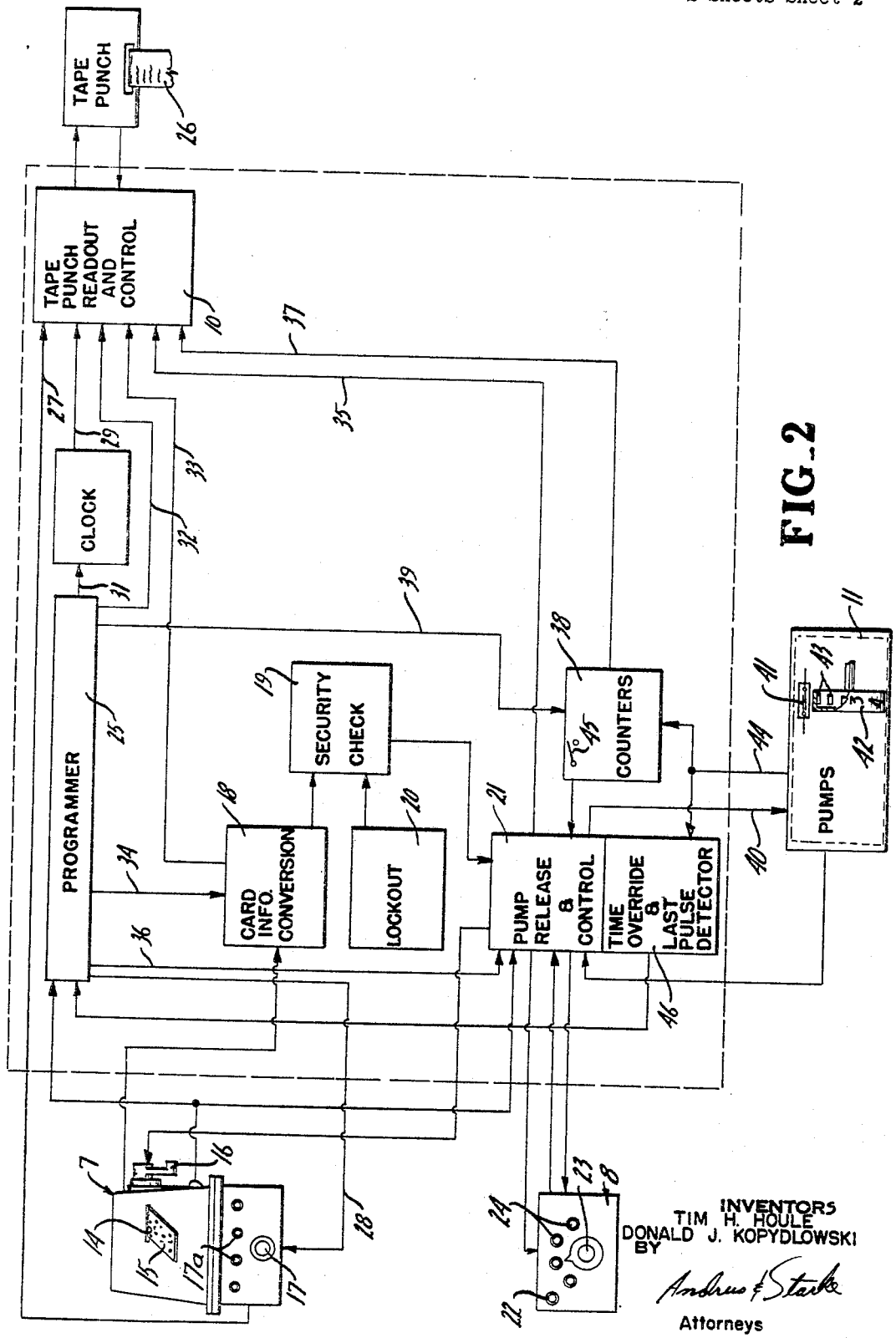
FIG._2

United States Patent Office 3,484,020
Patented Dec. 16, 1969

3,484,020
CODE CONTROLLED APPARATUS
Tim H. Houle, Wauwatosa, and Donald J. Kopydlowski, Milwaukee, Wis., assignors to A. O. Smith Corporation, Milwaukee, Wis., a corporation of New York
Filed Dec. 26, 1967, Ser. No. 693,494
Int. Cl. B67d 5/10; G07f 13/00
U.S. Cl. 222—2
13 Claims

ABSTRACT OF THE DISCLOSURE

A gasoline station control includes a punched card reader which provides a card related signal to an authorized card check device. If the card is valid, a pump release system is actuated. A switching device is actuated to select a desired pump with an indicating light provided to indicate those presently in operation. Release of the code card from the reader automatically actuates a programmer which automatically transfers the card information, the pump information and such other information as might be desired into a tape punch. The customer then goes to the pump to complete the transaction.

The pump provides a train of pulse signals to operate a related counter. The pulse signals are also preferably fed into a time override and the last signal detector. This detector starts a timing cycle upon the setting of the pump in condition for operation. If a signal is not received within a given period, the programmer is actuated to record the pump information and zero volume and the pump is turned off.

---

This invention relates to a code controlled apparatus or system and especially to a system including a code reader interconnected to control a plurality of dispensing means or loads.

Recent developments in marketing include the merchandising of goods without the active assistance of the proprietor or seller. For example, self-service gasoline service stations have been suggested wherein the dispensing of gasoline can be controlled by the insertion of coins, tokens or credit cards. A highly satisfactory form of credit device is a punched apertured card having the customer's code inserted in accordance with predetermined blank and punched spaces. Such systems permit credit for many customers wherein a large number of cards can be distributed to different customers for self-service operation. Self-service gasoline dispensing is particularly adapted to the trucking industry and the like where relatively large amounts of gasoline are employed by creditors which can be readily controlled. However, under present systems, the truly self-service units normally require separate readers for the individual control stations or dispensing means or some form of control by an attendant. The present invention is particularly directed to the use of a single code reader for controlling release of any one of a plurality of dispensing means with automatic controls for recording the transactions. Consequently, a single card reader can be installed while permitting complete self-service actuation of a plurality of different dispensing means.

Generally, in accordance with the basic concepts of the present invention, the system is established such that the authorized customer sets a code input means in accordance with his authorized code, either through a manual actuation of switches, the insertion of a code card or the like. The customer selects the particular dispensing means he wishes to employ and actuates a suitable control to obtain release thereof. This release is, of course, dependent upon the proper actuation of the code input means. After making the selection, he actuates a final release means to complete the setting of the dispensing means for operation. This results in an automatic transfer of information to a recording means to record the customer's card, the selected pump or dispensing means and such other information as deemed necessary. The customer then goes over and actuates the dispensing means to obtain the product desired in the normal self-servicing manner.

The dispensing means is constructed to record the amount of the product taken and when the dispensing is terminated to transmit that information into the automatic readout system or recording means. To guard against a situation where a customer might drive in, set a dispensing means for operation and then not actually actuate the dispensing means, a time override and recording detector is employed to force the readout after a short period sufficiently long to allow for the normal operation of the initiation of the dispensing cycle but sufficiently short to properly reset the system to standby if the customer should drive away.

The recording means thus accepts the information in sequence from the code reader and from the dispensing means. By reading the information backwards, the various dispensing transactions can be determined and related to the proper customer.

The system preferably, of course, includes a security check means to lock out any permissive code input. Thus, for example, it may often be desirable to lock out certain customers because of a poor credit development after the initial authorization.

More particularly, the present invention may provide a punched card reader having a means to receive a punched card and to lock such punched card therein until a complete pump selection has been made. The insertion of the card into the card reader and the actuation thereof provides a signal to a card security check channel where the permissibility of the authorized card is determined and if it is not an invalid card, information is sent to a pump release system to permt release of any one of the dispensing means. Simultaneously the signal is set back to the card reader to indicate to the customer that he may make his selection. The customer actuates a switching device to select any dispensing means which has not presently been in operation. Suitable indicating means can be provided to indicate those dispensing means which are in operation. If he makes a proper selection, a lamp will be illuminated. If he makes an improper selection, a flashing signal or the like will be received. After he has made his selection, the corresponding dispensing means will be set to permit dispensing of products to him. The card reader is then actuated to release the code card and to automatically actuate the programmer which is interconnected to a tape printer or other readout device. The programmer automatically transfers the card information, the pump information and such other information as might be desired into a tape or other permanent record. The customer then goes to the dispensing means to complete the transaction. Having left, the card reader is immediately available for subsequent customers.

During the dispensing cycle, the dispensing means provides a control signal which is transferred into suitable counters which are interconnected to transfer such information into the readout device at the end of the cycle. The signals are also preferably fed into a time override and the last signal detector. This circuit starts its timing cycle upon the actuation of the release of the code card and the setting of the pump dispensing means in condition for operation. If a signal is not received within a given period, a signal is transmitted to the programmer which in turn actuates the readout device to record the completion of a transaction. Thus, if the customer has not actually dispensed any products, a forced readout is obtained which automatically is recorded by pump information, number or the like and a zero volume dispensed. Similarly, if he does in fact dispense products through a normal channel but does not reset the system and should attempt to drive away, the system would provide a forced readout of the quantity of product taken after the selected time period. Normally the completion of the dispensing operation and the resetting of the dispensing means to its normal physical supporting arrangement provides a signal to the pump release and control to shut off the pump mechanism and simultaneously actuate the programmer to initiate a completed transaction readout.

Thus, the present invention provides a reliable and simplified coded control system wherein a substantial number of load means can be controlled and selected from a single coded input reader.

The drawings furnished herewith illustrate a preferred construction of the present invention in which the above advantages and features are clearly disclosed as well as others which will be clear from the following description.

In the drawings:

FIG. 1 is a diagrammatic illustration of a gasoline service dispensing system showing a pair of dispensing pumps interconnected to be actuated and controlled from a single card reader;

FIG. 2 is a block diagram showing the interconnection between the card reader and a pump control and a readout means;

FIG. 3 is a view of a code card for use in the reader shown in FIGS. 1 and 2; and FIG. 4 is a typical illustration of a tape readout system employed in connection with the present invention.

Referring to the drawings and particularly to FIG. 1, the invention is shown applied to controlling of a self-service gasoline dispensing system including a pair of pumps 1 and 2 connected to a pair of different storage means or tanks 3 and 4. Each of the storage tanks 3 and 4 will normally be connected to a plurality of dispensing pumps and each pump will be similarly interconnected for individual control in the same manner as pumps 1 and 2.

Each of the dispensing pumps 1 and 2 is of the usual variety employed in connection with gasoline service stations. Normally they include a reset knob or lever 5 interconnected to reset the dispensing means for the computer portion of the dispensing pumps to a reference or zero position. A switch lever or control unit 6 is also provided to actuate a final release switch means, not shown, which establishes flow through the related dispensing pump. In accordance with the present invention, the final release of the pumps is controlled by a common code or card reader 7 adapted to control the application of power to be the related dispensing pumps 1 and 2. As hereinafter described, the illustrated code reader accepts a punched code card such as shown in FIG. 3 to control the operation of the pumps 1 and 2. Additionally, at the card reader, a load or pump selector unit 8 is provided such that an authorized customer can select either of the pumps 1 or 2. The card reader 7 and the pump selector 8 are interconnected to a control assembly 9 which is interconnected to control pumps 1 and 2 and further includes a readout unit 10 for recording the particular code inserted into the reader as well as the particular pump selected. The readout 10 is further responsive to completion of a dispensing operation and the returning of the dispensing pump nozzle to the standby position to record the volume appearing on the computer of the dispenser and also the dispensing means code number.

Thus, the operation may be briefly summarized as follows. The customer drives to the code card reader 7, inserts his code card therein. This information is transferred to the control unit 9 and if a proper code is present permits release of one of the dispensing pumps 1 or 2. The customer selects the particular pump 1 or 2 desired and then releases the code card, at which time the card information, time, date and pump number is recorded. The customer removes the card from the code reader and proceeds to the selected dispensing and withdraws the amount of product desired. At the end of the dispensing operation, the customer resets switch lever 6 to the standby position which initiates a readout cycle. The amount withdrawn through the pump and the particular pump number is recorder in readout assembly 10.

More particularly, each of the pumps 1 and 2 is a more or less conventional unit having a computer 11, which includes the usual individual record means, driven in accordance with the flow through the pump. The pump normally includes a solenoid valve 12 interconnected to control the discharge of gasoline products or the like and connected in line with a dispensing hose and nozzle 13. The nozzle 13 may be supported on a final switch control lever such that in order to return the nozzle to the normal condition, the circuit for controlling the solenoid valve 12 must be opened.

The illustrated card reader 7 is similar to that shown in the U.S. Patent 3,328,541 to Robert W. Ryno et al. which issued on June 27, 1967. Generally, the card reader includes a card slot 14 to receive an apertured operator identification code card 15 which is more clearly shown in FIG. 3. The card is disposed between a pair of contact carrying plates, not shown, with the apertures and blank spaces in the card aligned with corresponding card contacts or code contacts. A card lock and reader handle 16 is pivotally mounted to the side of the housing and interconnected to the one plate to cause it to move downwardly and to further result in a locking of the plate in such position. The movement of the platen results in the closing of the circuit in line with the apertures while maintaining all of the other circuits open. This thus provides a binary-type coding system on a plurality of permissive code circuit lines as more fully developed in the Ryno patent. Additionally, a readout push button 17 is provided to release the platen and particularly the code card 12 and, in accordance with the present invention, actuate an initial readout transaction as hereinafter more fully described.

The illustrated card reader further includes a plurality of manually operated odometer switches 17a. These merely provide a circuit which permits the customer to insert the mileage reading on his vehicle such that it can be recorded in the readout unit 10.

Referring particularly to FIG. 2, a block diagram of a system constructed in accordance with the present invention for interconnecting of the card reader to control each of the pumps 1 and 2 and the readout 10 is shown. The several components forming the part of the block diagram are more or less standard devices which can be readily selected by those skilled in the art. Thus, no detailed description thereof is shown or given in order to avoid undue complexity and confusion with respect to a description of the present invention.

Referring particularly to FIG. 2, the spstem includes a card information conversion unit 18 which is interconnected to the output of the card reader to establish an electrical record of the code input recorded by the card in response to the actuation of the card lock and reader handle 16. The output of the card information conversion unit 18 is connected to a security check unit such as comparator logic "And" network 19. If the code information set up in the memory unit is proper, the network 19 produces an output signal permitting release of a dispensing pump. Generally, a lockout network 20 will be connected to the logic comparator network 19 to permit lockout of previously permissive code cards 15. This will permit disconnection of a customer whose credit rating for some reason or another is no longer adequate.

Assuming a proper code input, the comparator network 19 transmits a signal to a pump release and control network 21. This signal will set the pump and release control unit for operation and furthermore transmit a signal to the pump selection unit 8 to energize a lamp 22 or other device and indicate to the customer that the code card 15 has been authorized and he is permitted to make a selection.

The pump selector 8 is shown as a switching network including a rotating switch member or lever 23 which is selectively positioned with respect to a plurality of circumferentially arrayed indicating lamps 24. The switch lever 23 is coupled to appropriate switches related to the several dispensing pumps 1 and 2 as well as others which might be provided in the system. When the operator selects a pump, a signal is transmitted to the pump release and control unit 21 and the valve 12 of the pump selected is actuated. If a proper pump has been selected, the corresponding light 24 adjacent the lever 23 will be illuminated. If such pump is not authorized to this customer or if another customer is already using that pump, the lamp 24 will flash and indicate to the customer that he must make another selection.

After he has made his selection, he actuates the readout push button 17 on the card reader. This simultaneously transmits a signal to the pump release and control unit 21 and to a programmer 25. The pump control and release unit 21 is thereby actuated to actually release the corresponding selected dispensing means for operation. Simultaneously, the signal to the programmer 25 initiates a transaction cycle to actuate the readout unit 10 and complete a readout.

The programmer 25 is any suitable sequence controller and is readily available commercially. Generally, it includes a first input line connected to the reader 10 to initiate a load record cycle and a second input line connected as a terminal means to initiate an operations record cycle.

The readout unit 10 is shown as a tape punch unit adapted to provide a readout on a continuous tape 26. The illustrated unit 10 includes six inputs which are respectively interconnected to the system to record selected information. Thus, an odometer line 27 is interconnected to the card reader 7 and is adapted to transmit the reading inserted on the odometer switches into the unit 10 for printout on the tape 26 in the form of a punched tape. The programmer includes a control line 28 connected to the reader 7 to transmit the reading via the line 27 to the tape unit 10.

A clock line 29 interconnects a clock 30 to the unit 10 to record the time of a particular transaction. The transfer of the clock information is controlled through a signal line 31 from the programmer 25. A standard information and function control input line 32 is interconnected from the programmer 25 to the tape punch unit 10 to record any standard information which is to be required with each and every transaction.

A fourth input and card or operator identification code input line 33 is interconnected between the card information conversion unit 18 and punch unit 10. The programmer 25 includes a line 34 to the card information conversion unit 18 for the sequential transfer of the information therefrom to the readout. Additionally, a pump information line 35 is interconnected between the tape punch unit 10 and the pump release and control unit 21. The programmer 25 is connected by a line 36 to the pump release and control unit 21 to transmit the pump information to the tape punch unit 10 in proper sequence.

The sixth input line 37 to the tape punch unit 10 is a product volume line interconnected to a set of counters 38 related respectively to the pumps 1 and 2. A product transfer line 39 interconnects the programmer 25 to the counters 38 to transfer the information to the tape punch unit.

During the initial reading, the appropriate counter 38 will, of course, have a zero reading.

Referring particularly to FIG. 4, a typical format of a punched readout for a pump select program is shown as a result of the sequential activation of the line connections to the readout unit 10. The standard information line 32 first provides a station identification. The clock 30 is then activated to record the time, particularly by day, hour and minutes. The day information can be transferred from the standard information line 32 whereas the hour and minutes will be received from the clock 30. The programmer 25 then establishes a signal via line 36 to transmit the pump identification code from unit 21 via line 35. The odometer reading as manually inserted into the selector 8 is by actuation of switches 17a is transferred via line 27 by the programmer 25. The final information is from the card into conversion unit 18 which may include driver information as well as vehicle information and the like.

When the program has been completely punched on the paper tape 26, the lamp 22 at the card reader 7 is turned off. This indicates that the initial transaction has been completed and that the card 15 can be removed from the reader 7 by raising handle 16 as a final release operation. The drive then proceeds to the dispensing pump 1 or 2 to complete the transaction.

Each of the pumps 1 and 2 is similarly constructed and includes a related release line 40 from the pump release and control unit 21 to permit a dispensing operation if a proper code card was used and proper selection made. Each of the pumps 1 and 2 further includes a similar pulse switch 41 which is adapted to open and close a circuit in accordance with the volumetric flow therethrough. For example, the copending application of Stephen Stasenko et al., entitled Register Driven Transmitter, filed on Feb. 7, 1966 with Ser. No. 525,473, now Patent No. 3,344,986, discloses a highly satisfactory pulse switch system for recording the volumetric flow. As more fully disclosed therein, a small reed switch 41 is mounted adjacent one of he counting wheels 42 of computer 11. The wheel 42 is provided with a plurality of circumferentially distributed actuating magnets 43. As the pump is actuated, the wheel 42 rotates and sequentially moves the magnets 43 past the reed switch 41 which opens and closes accordingly and provides a pulse signal in accordance with the volumetric flow. The pulse signal is transmitted via a transmission line 44 to the appropriate counter 38 which is related to the particular pump to record the volumetric flow thereon for subsequent transmission to the tape punch unit 10. Thus the amount of flow is not only recorded on the pump but is simultaneously recorded on the remote unit.

The counter 38 further includes a suitable control switch 45 to provide a maximum quantity discharge in one cycle. In conventional practice, the switch will be actuated when the related counter reaches 190 gallons. This is somewhat less than the maximum amount of gasoline that the commercially available trucks will accept. When the switch 45, which serves as a transaction terminal means, closes, a signal is established in the pump release and control unit 10 to terminate the transaction and force a readout in the same manner as if the customer had terminated the flow and returned the system to a standby condition.

Additionally, the pulse signals from the switch 41 are transmitted to a time override and last pulse detector 46 which provides an output signal if a pulse signal is not received for a predetermined time period. For example, U.S. Patent 3,318,479 which issued to Tim H. Houle discloses a highly satisfactory last pulse detector circuit which will provide an output if pulses are not received at a particularly desired rate. If a pulse is not received within a selected time period after releasing of the pump for operation or during the pumping operation, a signal is transmitted to the programmer 25 to set the programmer to the final readout or transaction recording.

For example, if the driver does not start to load his vehicle within five minutes after which he has selected a particular pump 1, the pump 1 is automatically shut down and the load transaction is recorded with the same information as if the load or product were loaded but the product printout will then be zero. Further, the detector 46 insures proper transmission of pulses to the counter 38, as noted in the Houle patent. Under normal operation, the operator withdraws the amount of gasoline desired, resets the dispensing pump and opens the final control switch to establish a pulse signal to the programmer 25 establishing the final transaction recording.

The final information punched to complete the loading transaction may be as shown in FIG. 4. The unit 10 would again record the station, the time, the related pump identification. In the final transaction program, the volume recorded on the counter 38 for the particular identified pump is recorded. Once the transaction has been recorded, the lamp 24 on the pump selector will be turned off and that pump is again available for another customer.

The operation of the illustrated embodiment of the invention is briefly summarized as follows. When a customer approaches the station and desires to gain access to a particular pump, he inserts his credit card 15 into the card reader 7. The combination of holes and blank spaces corresponds to binary coded information regarding the identification of the driver, the vehicle, the type of product and such other information as might be desired. The card reader 7 converts the pattern of holes and blanks to electrical signals which are sent to the unit 18. If a proper card is inserted, the signal lamp 22 is illuminated indicating that the card 15 is accepted and that a pump 1 or 2 can be selected. The operator then actuates the pump selector unit 8. If the pump selected is available and authorized, the lamp 24 is illuminated. If it is not available or not authorized, the lamp 24 flashes to indicate that an improper selection has been made.

To retrieve the credit card 15 after having made the selection, the customer must actuate the push button 17 which actuates the programmer 25 to transfer the related input information into the tape punch unit and then releases the code card.

The customer then proceeds to the pump 1 and withdraws the product by operating the pump 1 in the normal manner. During the loading of the vehicle, the transmitter switch 41 transmits signals simultaneously to the counter 38 and to the time override and last pulse detector 46. The counter 38 records the amount of product dispensed. The time override and last pulse detector 46 maintains the circuit operative. If more than 190 gallons is attempted to be withdrawn, the counter 38 automatically transfers a shutdown signal into the pump release and control unit 21. The automatic shutdown can also be employed to prevent withdrawal of quantities beyond the capabilities of the counter. For example, if a 200 gallon counter were employed and 210 gallons were withdrawn from the system, the counter would only read 10 gallons. This would then be transferred into the tape punch unit and thus provide an erroneous reading of the actual amount withdrawn.

Assuming, however, that less than that amount has been taken, the customer resets the dispensing pump 1 to complete the dispensing transaction. This directly provides a pulse signal into the programmer 25 to record the desired transaction. If the customer forgets to provide the desired proper operation or if for any reason the proper signal is not transmitted, the time override and last pulse detector 46 will force the readout after a preselected time. After the readout, the pump is released for another customer.

The tape 26 provides a complete record of information regarding the several inserts into the card reader 7 and the operation of the dispensing pumps 1 and 2. The information can be read backwards or in the reverse order and properly related to each customer and pump. In reading the tape 26, the first load transaction for a particular pump following the first pump select program for that pump provides the necessary interrelated information.

By employing a punched tape assembly such information can be correlated and interrelated through a separate computer or the like to provide cumulative information on which drive or how much gasoline each of the drivers have taken and from where they derived the product.

The present invention thus provides a relatively simple control circuit wherein a single card reader can be employed to control a plurality of different dispensing pumps.

Various modes of carrying out the invention are contemplated as being within the scope of the following claims particularly pointing out and distinctly claiming the subject matter which is regarded as the invention.

We claim:

1. In a control system for recording the operation of a plurality of load means each having a load identification code of said means, comprising a recording means, a common code reader means having an input to receive an operator identification code and an output means connected to said plurality of load means to selectively release one of said load means for subsequent operation independently of said code reader means, connecting means connecting the code reader means to the recording means to record the operator identification code input and the load means identification code of the released load means, individual record means to separately record the operation of each load means, and transaction terminal means responsive to termination of the operation of the load means to transfer the record of the individual record means of the load means and the load identification code of the related load means to the recording means.

2. The control system of claim 1 wherein said recording means includes a continuous and sequential physical record of the operations of the reader means and load means, said physical record being adapted to be read by a machine reader.

3. The control system of claim 1 wherein said recording means is a continuous tape unit having a plurality of inputs and a single continuous tape, a load selector means is operably connected in circuit with the code reader means and includes a switching means having an indicator operable when the reader means releases the selector means and having individual indicators for each load means, said selector means having a movable input member movable to a plurality of operating positions, one for each of said load means, said code reader means being an apertured card reader and having means to lock the card in the reader and having a final release operator, and said connecting means including a card conversion unit connected to the reader means and to the tape unit and having a load release means connected to the conversion unit and to the selector means to establish permissive operation of the selected load means, said release means having a pump identification line connected to said tape unit.

4. The control system of claim 3 having a programmer having a load input means connected to said reader means and responsive to actuation of said release operator and a terminal input means forming said terminal means, said programmer being connected to actuate the conversion unit and said release means to record the card identification code and the load identification code in response to actuation of the final release operator, and to record the pump identification code and the related record of the individual record means in response to termination of the operation of the load means.

5. The control system of claim 3 wherein each load means includes a switch means opened and closed in accordance with the operation of the load means and having a pulse actuated timer for each of said load means and connected in a circuit with said switch means and said terminal means to actuate the terminal means if the load means is not operated to actuate said switch means for a selected period following operation of said selector means.

6. The control system of claim 1 wherein each of said individual record means is a pulse actuated counter and a switch means connected to actuate the counter in accordance with the operation of the corresponding load means, each of said counters having a limit switch means connected to actuate said release means and terminate operation of the corresponding load means after a predetermined maximum permissible load operation.

7. The control system of claim 1 having a load selector means for selecting which of said load means is to be actuated, said card reader having said output means connected to the load selector to conjointly control the release of said load means.

8. The control system of claim 7 wherein said load selector means for selectively releasing said load means includes a switching means settable in a plurality of positions one for each of said load means and indicating means responsive to the selection setting to indicate the availability of the selected load to the operator.

9. The control system of claim 7 wherein said recording means is a tape unit having a plurality of inputs and a continuous output tape, said connecting means including a card conversion unit connected to the reader means and to the tape unit and having a load release means connected to the conversion unit and to the selector means to establish permissive operation of the load means said release means having a pump identification line connected to said tape unit, and said code reader means being an apertured card reader and having means to lock the card in the reader and a final release operator to unlock the card and actuate said release means to establish said load means for operation.

10. The control system of claim 7 having timer means reset by said load means and operative to actuate said terminal means if the load means is not actuated to reset the timer means for a selected period following operation of said selector means.

11. The control system of claim 7 wherein said recording means is a punch tape unit having a plurality of inputs, said load selector means is a switching means having an indicator operable when the reader means releases the selector means and having individual indicators for each load means, said selector means having a movable input member movable to a plurality of positions, one for each of said load means, said code reader means being an apertured card reader and having means to lock the card in the reader and a final release button, said connecting means including a card conversion unit connected to the reader means and to the tape unit and a load release means connected to the conversion unit and to the selector means to establish permissive operation of the load means, said release means having a load identification line connected to said tape unit, said individual record means being a plurality of pulse actuated counters and a switch means connected one each to each load means, said counters having an output connected to the tape unit, each of said counters having a limit means connected to actuate said release means, a programmer having a load input means connected to said reader and responsive to actuation of said release button and a terminal input means forming said terminal means, said programmer being connected to actuate the conversion unit and said release means to record the card identification code and the load identification code in response to actuation of the final release button, and to record the pump identification, code and the related counter reading in response to reset action of the load means, and a pulse actuated timer connected to said switch means, and operative to actuate said terminal means if the load means is not actuated for a selected period following operation of said selector means.

12. The control system of claim 7 wherein a security check means connects the code reader to the load selector means to permit cutout of previously authorized operator identification code inputs.

13. In a dispensing system having a plurality of different dispensing means and a code reader connected to provide coded control of the plurality of different dispensing means, a common code input means forming a part of said card reader and settable in a plurality of permissive code settings, a recording means having a plurality of input channels for receiving different information on said channels, one of said channels being connected to said code reader to record the setting of the code input means, a release means for said dispensing means, means connecting said release means to said code reader and setting said release means to operate in response to insertion of a permissive code setting, selection means connected to said release means to actuate said release means after said setting thereof for release of any one of said dispensing means for operation of the dispensing means independently of said code reader, said recording means having a channel connected to the release means to record the dispensing means selected and the setting of the code means, and means responsive to predetermined actuation of said selected dispensing means to actuate the recording means and record the quantity withdrawn and the related dispensing means identification code.

References Cited

UNITED STATES PATENTS

| | | | |
|---|---|---|---|
| 2,977,024 | 3/1961 | Harris | 222—2 |
| 2,564,015 | 8/1951 | Lillig | 222—2 |
| 3,255,339 | 6/1966 | Rausing | 222—2 X |
| 3,312,372 | 4/1967 | Cooper | 222—2 |
| 3,357,531 | 12/1967 | Romanowski | 222—2 X |

ROBERT B. REEVES, Primary Examiner

H. S. LANE, Assistant Examiner

U.S. Cl. X.R.

222—26, 30